United States Patent [19]
Wright

[11] Patent Number: 5,161,365
[45] Date of Patent: Nov. 10, 1992

[54] ENDOTHERMIC FUEL POWER GENERATOR AND METHOD

[75] Inventor: E. Scott Wright, Mesa, Ariz.

[73] Assignee: Allied-Signal Inc., Morris Township, Morris County, N.J.

[21] Appl. No.: 623,145

[22] Filed: Dec. 5, 1990

[51] Int. Cl.$^5$ .......................... F02C 1/00; F02G 3/00
[52] U.S. Cl. .................. 60/39.02; 60/39.461; 60/736
[58] Field of Search ................ 60/736, 39.02, 39.461, 60/39.465

[56] References Cited

U.S. PATENT DOCUMENTS

| | | | |
|---|---|---|---|
| 2,660,032 | 10/1947 | Rosenthal | 60/39.02 |
| 2,839,892 | 6/1958 | Rosenthal | 60/39.05 |
| 3,067,594 | 12/1962 | Bland et al. | 62/4 |
| 3,188,961 | 6/1965 | Scruggs et al. | 102/92.5 |
| 3,198,710 | 8/1965 | Long | 176/39 |
| 3,263,414 | 8/1966 | Herbst | 60/35.4 |
| 3,273,332 | 9/1966 | Poudrier | 60/35.4 |
| 3,305,319 | 2/1967 | Kowalick et al. | 23/281 |
| 3,478,528 | 11/1969 | McCully | 62/3 |
| 4,020,632 | 5/1977 | Coffinberry et al. | 60/736 |
| 4,099,931 | 7/1978 | Bryant et al. | 44/80 |
| 4,741,152 | 5/1988 | Burr et al. | 60/39.02 |

FOREIGN PATENT DOCUMENTS

| | | | |
|---|---|---|---|
| 0120826 | 5/1988 | Japan | 60/736 |
| 0112631 | 4/1990 | Japan | 60/736 |

OTHER PUBLICATIONS

G. L. Roth and O. L. Williamson, "How to use fuel as a heat sink", Space-Aeronautics, Mar. 1960, pp. 56-61.

Primary Examiner—Richard A. Bertsch
Assistant Examiner—Howard R. Richman
Attorney, Agent, or Firm—Jerry J. Holden; James W. McFarland; Robert A. Walsh

[57] ABSTRACT

A secondary power generating system and method is provided that can drive an aircraft's accessories, and deliver cooling flow and fuel flow to a propulsion engine such as a turbojet, ramjet or turboramjet. This system and method employs a heat exchanger in which high pressure, endothermic, liquid fuel absorbs heat from the air exiting the engine's compressor and as a result is transformed into a high pressure, gaseous fuel. The high pressure gas is expanded across a motor which extracts the pressure energy and converts this energy into mechanical power for driving accessories. The gas is then fed into the engine's combustor where it is ignited. The cooled air exiting the heat exchanger is returned to the propulsion engine and is used for cooling various components such as blades and shafts therein.

13 Claims, 1 Drawing Sheet

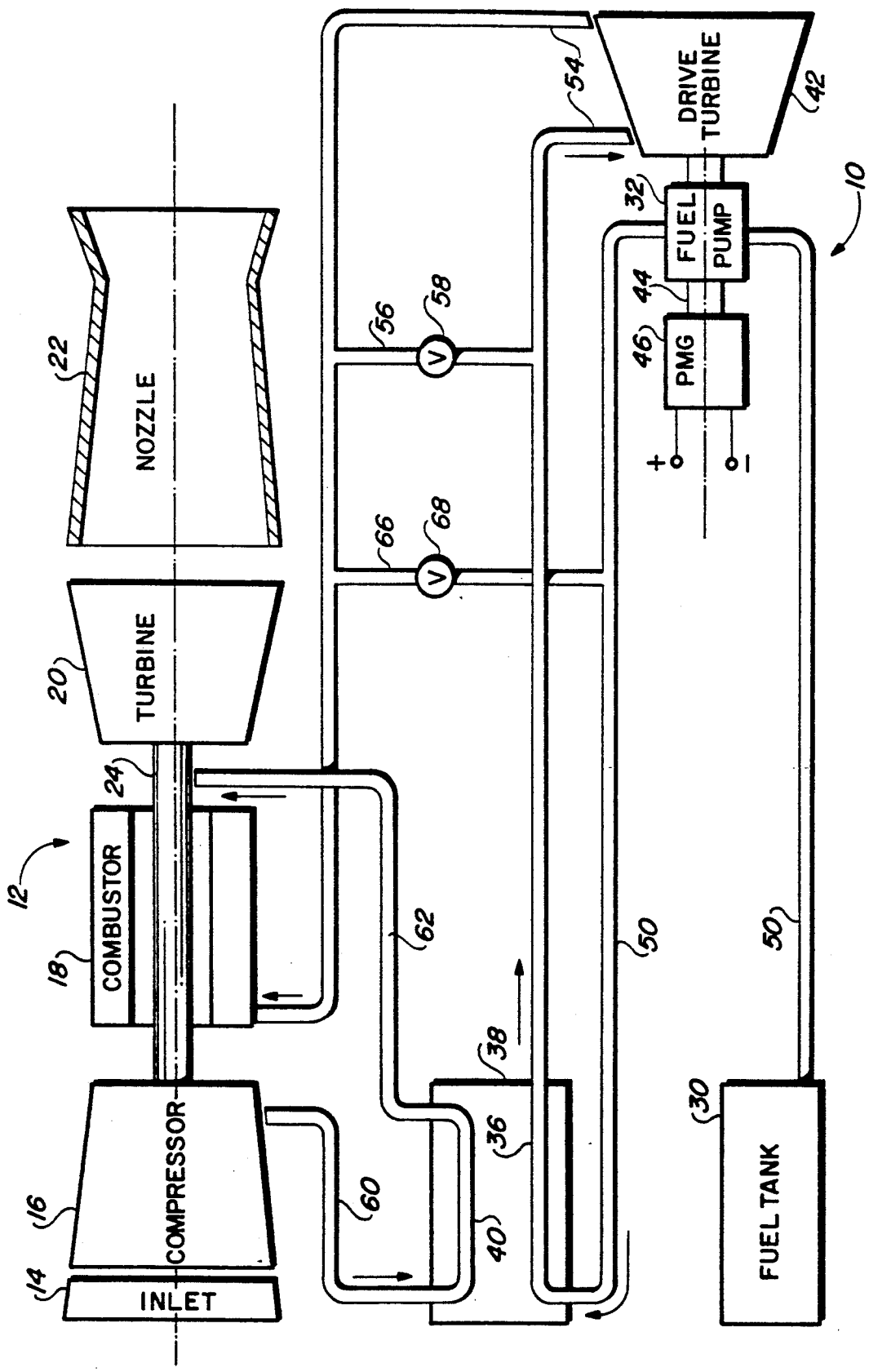

1

ENDOTHERMIC FUEL POWER GENERATOR AND METHOD

TECHNICAL FIELD

This invention generally relates to power generating systems and methods for supplementing the power output of a propulsion engine such as a turbojet, ramjet, or turboramjet operating at a high mach number, and more specifically to a power generating system and method that includes a high pressure, endothermic reaction to generate cooled air and gaseous fuel for the propulsion engine while also providing mechanical power for driving accessories such as pumps and generators.

BACKGROUND OF THE INVENTION

An aircraft in flight requires two types of power from its power plant(s). The first of these powers is in the form of thrust to propel the aircraft forward and the second is in the form of mechanical power for driving accessories such as a fuel pump, hydraulic pump and/or an electric generator. For aircraft operating at subsonic or low supersonic velocities, both thrust and accessory power is usually provided by one or more air breathing engines, such as a turbojet. A turbojet is comprised of a casing encompassing an inlet section, a compressor section, a combustor section, a turbine section, and an exhaust nozzle section arranged in flow series so as to keep the overall width of the engine to a minimum and thereby reduce the drag. Air, from the environment surrounding the engine, enters through the inlet section and into the compressor section where it is pressurized. The pressurized air then exits the compressor section and enters the combustor section where it is mixed with fuel and ignited. This hot gas mixture of air and fuel is then expanded across the turbine section and then through the exhaust nozzle section. In the turbine section a portion of the pressure energy of the hot gas is extracted from the gas and converted into mechanical power. The remaining pressure energy of the hot gas is converted in the exhaust nozzle section to thrust for propelling the aircraft forward. The mechanical power output of the turbine section is used to drive the compressor section. Additionally, the engine has an accessory gearbox to which the aircraft's accessories are operably mounted. The accessory gearbox is driven by the compressor and is mounted along the outside of the casing. The disadvantages associated with an accessory gearbox include weight penalties and increased width and drag of the engine.

For aircraft operating at high supersonic or hypersonic velocities, (i.e. a Mach number in the range of 3 to 6), alternative engine configurations like a ramjet or turboramjet can be used to provide thrust. In these alternate engine configurations as well as with the turbojet configuration, the inlet section of the engine operates as a diffuser reducing the velocity of the entering air and as a consequence increasing the air's static temperature and pressure. This diffusion is referred to, by those skilled in the art, as the ram effect and can produce air temperatures within the compressor on the order of 2500° F. and similar temperatures in the casing and accessory gearbox. This temperature is above the melting temperature of metals commonly used in accessory gearboxes and other components, within the engine, such as turbine shafts and blades. Consequently, at these operating conditions a heat sink, usually a tank of some cryogen, must be provided to cool the air exiting compressor. While it is relatively easy to deliver this cooled air to the shafts and blades of the engine, delivering sufficient cooled air to the gearbox is impractical and expensive. Further, at high mach numbers the weight and drag penalties associated with gearboxes are increased.

Consequently, it has been proposed to replace the accessory gearbox with a ram air turbine drivingly coupled to the aircraft's accessories. A ram air turbine is an impulse type turbine wheel which can be interposed into the high velocity air stream surrounding the aircraft when accessory power is required. The turbine wheel extracts kinetic energy from the air stream and converts it to mechanical power. The disadvantages of the ram air turbine include high cost and the significant drag generated when interposed in the air stream. Also, the ram air turbine cannot provide cooling flow for the engine's components.

Accordingly, a need exists for a power generating system and method that can drive the accessories, provide cooling flow, not produce excessive drag and be relativey inexpensive.

SUMMARY OF THE INVENTION

An object of the present invention is to provide a power generating system and method that can provide power to drive accessories without substantially increasing the drag on the aircraft.

Another object of the present invention is to provide a power generating system and method that can provide power cooling flow requires by the components of the gas turbine engine.

Yet another object of the present invention is to provide a power generating system and method that can provide a power generating system and method that can operate at any mach number.

Yet still another object of the present invention is to provide a power generating system and method that is relatively inexpensive.

The present invention achieves the above-stated objective by providing a secondary power generating system and method that incorporates a high pressure, endothermic reaction to cool a portion of the air exiting the compressor section and to drive a motor, such as a turbine, that in turn drives the accessories. Additionally, this secondary power generating system also provides gaseous fuel for the combustor. The system includes a heat exchanger in which high pressure endothermic liquid fuel absorbs heat from the air exiting the compressor and as a result is transformed into a high pressure gas. The high pressure gas is expanded across a secondary power system motor that extracts the pressure energy and converts this energy into mechanical power for driving accessories. The gas is then fed into the combustor where it is ignited. Thus, instead of a bulky gearbox or an expensive ram air turbine, the present invention provides a relatively inexpensive heat exchanger, whose shape can be conformed so that it can be mounted within the gas turbine power plant casing or within the aircraft's frame thereby avoiding creating any drag.

These and other objects, features and advantages of the present invention are specifically set forth in or will become apparent from the following detailed description of a preferred embodiment of the invention when read in conjunction with the accompanying drawing.

BRIEF DESCRIPTION OF THE DRAWINGS

The single FIGURE is a schematic, diagram of a secondary power generating system contemplated by the present invention in conjunction with a propulsion engine.

DESCRIPTION OF THE PREFERRED EMBODIMENT

Referring to the drawing, a secondary power system generally denoted by the numeral 10 is shown in conjunction with a propulsion engine 12. It will be understood that the hardware execution of the propulsion engine 12, that embodies this invention, can be any one of a plurality of engine configurations such as, but not limited to, a turbojet, a ramjet, a turboramjet, or a combined cycle engine. Accordingly, the propulsion engine 12 in the sole figure typifies, very schematically, such an engine. The propulsion engine 12 is comprised of, in a flow series arrangement, an inlet section 14, a compressor section 16, a combustor section 18, a turbine section 20 and an exhaust nozzle section 22. The compressor section 16 and the turbine section 20 are operatively coupled by a rotatable shaft 24.

The secondary power system 10 includes a fuel tank 30 having an endothermic fuel, as a low pressure liquid, stored therein. Preferably, the endothermic fuel is Methylcyclohexane or Decalin. A fuel conduit 50 extends from the fuel tank 30 to a first flow path 36 in a heat exchanger 38. A fuel pump 32 operably disposed in the conduit 50 is provided by pressurizing the endothermic fuel and delivering the liquid fuel to the heat exchanger 38. Concurrently, with the liquid fuel being delivered to the first flow path 36, a portion of the hot air exiting the compressor section 16 is fed through a hot air conduit 60 to a second flow path 40 in the heat exchanger 38. The flow paths 36 and 40 are positioned in relation to each other to effect heat exchange therebetween without commingling of the liquid fuel and the hot air.

Within the heat exchanger 38, the high temperature energy of the air in the second flow path 40 is heat transferred to the first flow path 36 and absorbed by the liquid fuel therein. The liquid fuel then vaporizes and exits the heat exchanger 38 in a gaseous state with only a very small pressure drop. This high pressure gaseous fuel flows from the first flow path 36 through a gas conduit 54 to the combustor section 18 where it is ignited.

The secondary power system 10 further includes a gas operated motor, such as a drive turbine 42, disposed within the conduit 54 intermediate the heat exchanger 38 and the combustor section 18. The drive turbine 42 converts a portion of the pressure energy of the gaseous fuel into mechanical energy for rotating a shaft 44 which drives the fuel pump 32 and any other accessory such as a permanent magnet generator 46. A bypass conduit 56 is in fluid communication with the gas conduit 54 both upstream and downstream of the drive turbine 42. A control valve 58 is disposed within the bypass conduit 56 and controls the amount of fuel flow to the drive turbine 42. The cooled air exiting the second flow path 40 passes through cooling flow conduit 62 and back to the propulsion engine 12. Another conduit 66, having a control valve 68, is in fluid communication with the conduit 50 downstream of the fuel pump 32, and the conduit 54 downstream of the drive turbine 42. The conduit 66 delivers liquid fuel to the combustor 18 during the startup of the engine 12 and whenever the ram effect is not large enough to generate sufficient heat the compressor's 16 discharge air flow to initiate the change-of-phase of the endothermic fuel in the heat exchanger 38. Alternatively, it will be apparent to those skilled in the art that the present invention may also form a portion of a compound engine utilizing, perhaps, an independent fuel system to drive the engine 12 at the lower mach numbers.

A method for generating cooled air and gaseous fuel for a propulsion engine 12 and driving the accessories onboard an aircraft operating at a high mach number is also provided. In this method, a low pressure, liquid, endothermic fuel is pressurized and fed to the heat exchanger 38. Consequently, high pressure air having a high temperature energy is bled from the compressor section 16 and also fed to the heat exchanger 38. Within the heat exchanger 38, the high temperature air is placed into a heat transfer relation with the liquid fuel, whereby the temperature energy is extracted from the air and used to transform the liquid fuel into a high pressure, gaseous fuel. The cooled air is then delivered back to the propulsion engine 12. Meanwhile, the high pressure gaseous fuel is partly expanded across the drive turbine 42 of the secondary power system 10 before being delivered to the combustor section 18. The drive turbine 42 converts the pressure energy of the gaseous fuel into mechanical work for driving the accessories. To assure adequate flow of gaseous fuel to the combustor 18, a portion of the gaseous fuel is bypassed around the drive turbine 42.

Thus, a secondary power generating system and method is provided that can drive an aircraft's accessories, can deliver cooling flow and fuel flow to the aircraft's propulsion engine, can operate at high mach numbers, does not create significant drag and is relatively inexpensive.

Various modifications and alternations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A method for generating cooled air and gaseous fuel for a propulsion engine and driving the accessories onboard an aircraft operating at a high mach number, said propulsion engine having in a flow series arrangement, a first section in which air is compressed, a second section in which said compressed air and fuel are mixed and ignite forming a pressurized hot gas, said pressurized gas being at a pressure slightly below the pressure of said compressed air, and a third section in which said hot gas is expanded, comprising the steps of:

directing high pressure, liquid, endothermic fuel through a heat exchanger;

directing a portion of said compressed air from said first section of said engine through said heat exchanger in heat exchange relation with said liquid endothermic fuel to heat and transform said liquid endothermic fuel into a high pressure, gaseous fuel and to cool said compressed air; and driving a gas motor with at least a portion of said high pressure gaseous fuel from said heat exchanger to generate mechanical power for operating said accessories.

2. The method of claim 1 further comprising the step of returning said cooled, compressed air from said heat exchanger to said third section of said engine.

3. The method of claim 2 further comprising the step of returning said high pressure gaseous fuel from said gas motor to said second section of said engine.

4. A method for generating cooled air and gaseous fuel for a propulsion engine and driving the accessories onboard an aircraft operating at a high mach number, said propulsion engine having in a flow series arrangement, a first section in which air is compressed, a second section in which said compressed air and fuel are mixed and ignite forming a pressurized hot gas, said pressurized gas being at a pressure slightly below the pressure of said compressed air, and a third section in which said hot gas is expanded, comprising the steps of:

provideing a heat exchanger;

supplying said heat exchanger with a high pressure, liquid, endothermic fuel;

supplying said heat exchanger with high pressure air having a high temperature energy substantially concurrently with the previous step;

positioning, within said heat exchanger, said liquid fuel in a heat transfer relation with said high temperature air, whereby a portion of said high temperature energy is absorbed by said liquid fuel, transforming said liquid fuel into a high pressure, gaseous fuel;

feeding said cooled air to said propulsion engine;

partly expanding said high pressure gaseous fuel across a gas motor;

delivering said partly expanded fuel to said second section of said engine; and driving said accessories with said gas motor.

5. The method of claim 4 further comprising the step of bypassing a portion of said high pressure, gaseous fuel around said gas motor.

6. The method of claim 4 wherein the step of supplying said heat exchanger with a high pressure, liquid, endothermic fuel further comprises the steps of:

storing low pressure, liquid, endothermic fuel in a tank; and pumping said low pressure fuel from said tank to said heat exchanger.

7. The method of claim 4 wherein the step of supplying said heat exchanger with said high temperature and pressure air further comprises the step of bleeding said high temperature and pressure air from said first section of said engine.

8. A secondary power generating system for providing power to drive accessories, cooling flow, and fuel flow for a propulsion engine, such as a turbojet, ramjet, or turboramjet, operating at high mach numbers and having an inlet section, a compressor section, a combustor section, a turbine section and an exhaust nozzle section, comprising in combination:

a source of high pressure endothermic fuel in a liquid state;

a source of air having a high pressure and temperature;

a heat exchanger having a first flow path therethrough for said air and a second flow path therethrough for said fuel, said first and second flow paths each having an inlet and an exit and being in a heat transfer relation with each other, whereby, said air exiting said first flow path is substantially cooler than said air entering said first flow path and said high pressure liquid fuel entering said second flow path is transformed into high pressure, gaseous fuel;

an air passageway between said exit of said first flow path and said gas turbine power plant;

a gas passageway between said exit of said second flow path and said combustor; and p1 motor means operably disposed in said gas passageway for extracting pressure energy from said gas and converting it to mechanical power for driving said accessories.

9. The power generating system of claim 8 wherein said source of high pressure, endothermic fuel in a liquid state is comprised of a source of low pressure, endothermic fuel in a liquid state and a fuel pump for pressurizing said low pressure fuel, said fuel pump being powered by said motor means.

10. The power generating system of claim 8 wherein said source of high pressure, high temperature air is a second air passageway connecting said compressor to said inlet of said first flow path.

11. The power generating system of claim 8 further comprising a gas fuel bypass for bypassing fuel around said turbine means, and a control valve operably disposed within said fuel bypass.

12. The power generating system of claim 8 further comprising a liquid fuel conduit means for delivering liquid fuel from said fuel pump to said combustor and a control valve operably disposed within said conduct.

13. A multiple power generating system for aircraft operating at high mach numbers having a fuel tank filled with liquid, endothermic fuel, said multiple power generating system being able to provide thrust, mechanical power to drive said aircraft's accessories, cooling flow and fuel flow, comprising in combination:

a propulsion engine comprising in a flow series arrangement, a first section in which air is compressed, a second section in which said compressed air and fuel air mixed and ignited forming a pressurized hot gas, said pressurized gas being at a pressure slightly below the pressure of said compressed air, and a third section in which said hot gas is expanded; and a secondary power system having a heat exchanger means with a first flow path therethrough, which is in fluid communication with said first and third sections of said engine, and a second flow path therethrough which is in fluid communication with said fuel tank and said second section of said engine so that fuel flows from said tank to said second section, said first and second flow paths being in a heat transfer reaction with each other, whereby, said first flow path delivers substantially cooled to said third section of said engine and said second flow path delivers gaseous fuel to said second section of said engine, said second flow path having a motor means operably disposed therein for extracting pressure energy from said gaseous fuel and converting it to mechanical power for driving said aircraft's accessories which includes a pump means for pumping said liquid fuel through said second flow path.

* * * * *

UNITED STATES PATENT AND TRADEMARK OFFICE
CERTIFICATE OF CORRECTION

PATENT NO. : 5,161,365
DATED : NOVEMBER 10, 1992
INVENTOR(S) : E. SCOTT WRIGHT

It is certified that error appears in the above-identified patent and that said Letters Patent is hereby corrected as shown below:

Column 4,
In Claim 1, Line 7, please replace "ignite" with --ignited--.
Column 5,
In Claim 4, Line 7, please replace "ignite" with --ignited--.
Column 6,
In Claim 8, Line 25, please delete "p1".

In Claim 12, Line 4, please replace "conduct" with --conduit--.

In Claim 13, Line 23, please replace "reaction" with --relation--.

In column 2, line 32, delete "power" and delete "requires" and substitute --required--.
In column 2, delete line 36.

Signed and Sealed this

Sixteenth Day of November, 1993

Attest:

BRUCE LEHMAN

Attesting Officer     Commissioner of Patents and Trademarks